United States Patent [19]

Shimada et al.

[11] Patent Number: 5,396,354
[45] Date of Patent: Mar. 7, 1995

[54] SWITCHING ELEMENT ARRAY AND A LIQUID CRYSTAL DISPLAY USING THE SAME

[75] Inventors: Yasunori Shimada, Nara; Tomohiko Yamamoto, Tenri; Hiroshi Morimoto, Kitakatsuragi; Yoshimi Kojima; Mitsuhiro Koden, both of Nara; Masaru Yoshida, Ikoma, all of Japan

[73] Assignee: Sharp Kabushiki Kaisha, Osaka, Japan

[21] Appl. No.: 94,307

[22] Filed: Jul. 20, 1993

[30] Foreign Application Priority Data

Jul. 24, 1992 [JP] Japan .................. 4-198848

[51] Int. Cl.⁶ .................. G02F 1/136; H01L 45/00
[52] U.S. Cl. .................. 359/58; 359/60; 359/79; 257/72
[58] Field of Search .................. 359/54, 58, 59, 60, 359/79, 87; 345/90, 91; 257/2, 4, 5, 42, 43, 59, 72

[56] References Cited

U.S. PATENT DOCUMENTS

| | | | |
|---|---|---|---|
| 4,486,767 | 12/1984 | Fraleux et al. | 357/23 |
| 4,810,637 | 3/1989 | Szydlo et al. | 437/15 |
| 4,832,456 | 5/1989 | Yamazaki et al. | 359/79 |
| 4,836,655 | 6/1989 | Yamazaki | 359/79 |
| 4,944,575 | 7/1990 | Aigrain et al. | 359/58 |
| 5,042,917 | 8/1991 | Fujita et al. | 359/72 |

FOREIGN PATENT DOCUMENTS

49-75096 7/1974 Japan .

OTHER PUBLICATIONS

D. Castelberry–"Control Layers for Liquid Crystal Matrix Displays" 1980 Biennial Display Research Conference IEEE –Oct. 1980–pp. 89–92.

Castleberry et al., "2"×5" Varistor-Controlled Liquid Crystal Matrix Display", SID International Symposium, Digest of Technical Papers, vol. XI, Apr. 1980, Coral Gables, US, pp. 198–199.

Adams et al., "Non-Linear Blocking Layer for Matrix Address Displays", Xerox Disclosure Journal, vol. 2, No. 3, May 1977, Stanford, US, p. 63.

Muller, "Flachdisplay fur das hochauflosende Fernsehen", Fernseh- Und Kino-Technik, vol. 45, No. 9, 1991, Berlin, DE, pp. 443–447.

*Primary Examiner*—William L. Sikes
*Assistant Examiner*—Tai V. Duong
*Attorney, Agent, or Firm*—Nixon & Vanderhye

[57] ABSTRACT

In the liquid crystal display, a liquid crystal layer is provided between a first insulating substrate and a second insulating substrate. A plurality of first electrodes are arranged in parallel on the first insulating substrate in a first direction, and a first insulating layer is formed on the entire surface of the first insulating substrate and covers the first electrodes. A semiconductor layer is formed on the first insulating layer, and a second insulating layer is formed thereon and covers the entire surface of the first insulating substrate. This triple-layered structure constitutes a switching element array. A plurality of second electrodes are arranged in parallel on the second insulating electrode in a second direction crossing the first direction. Thus, the switching element array sandwiched between the first and second electrodes is used for driving the liquid crystal layer.

14 Claims, 9 Drawing Sheets

PRIOR ART

SWITCHING ELEMENT ARRAY AND A LIQUID CRYSTAL DISPLAY USING THE SAME

BACKGROUND OF THE INVENTION

1. Field of the Invention

The present invention relates to a switching element array and a liquid crystal display using the same.

2. Description of the Related Art

A liquid crystal display, an EL display, etc. are known in the art in which pixel electrodes are selected and driven so as to form patterns on a display screen. As the driving method of pixel electrodes, there is known an active matrix driving method in which independent pixel electrodes are arranged in a matrix, and each provided with a switching element to drive the pixel electrode selectively. In such a liquid crystal display, by applying a voltage between the pixel electrode selected by the switching element and a counter electrode, display medium such as liquid crystal sealed between the electrodes is optically modulated. This optical modulation is visually observed as a display pattern on the screen.

Such a driving method enables the display to have a good contrast in its picture, and finds many applications such as in television, etc. As the switching elements for selecting and driving the pixel electrodes, three-terminal type of TFTs (thin film transistor), MOS transistors, etc. and two-terminal type of MIMs (metal-insulating layer-metal), diodes, varistors, etc. are generally used.

FIG. 13a is a perspective view showing an exemplary liquid crystal display employing the active matrix driving method. FIG. 13b is a cross-sectional view of the display of FIG. 13a. As is shown in FIGS. 13a and 13b, a transparent insulating substrate 21 and a counter substrate 26 face each other, and a liquid crystal layer 28 is sealed therebetween. On the transparent insulating substrate 21, a plurality of source electrodes 22 and a plurality of gate electrodes 23 are arranged so as to cross each other at right angles. At each rectangular region bounded by adjoining source electrodes 22 and gate electrodes 23, a pixel electrode 24 for driving liquid crystals is provided. Each pixel electrode 24 is provided with a TFT 25 as a switching element. An orientation film 30 is formed on the region provided with the pixel electrode 24 so as to fully cover the region.

A counter electrode 27 is provided on the counter substrate 26 so as to face the pixel electrode 24 on the insulating substrate 21. An orientation film 31 is formed on the counter electrode 27.

A seal resin 29 is provided at peripheral portions of the liquid crystal layer 28 sandwiched between the counter substrate 26 and the insulating substrate 21, thereby sealing the liquid crystal layer 28.

Such a liquid crystal display is operated as follows: First, a single gate electrode 23 is selected, a gate signal is applied to the selected gate electrode 23, and all of the TFTs 25 connected to the gate electrode 23 are turned to an ON-state. By applying a source signal synchronized with the gate signal via a source electrode 22, each pixel electrode 24 provided with the TFT 25 receives the source signal. As a result, a potential difference required for the display is gained between the pixel electrode 24 and the counter electrode 27. The corresponding charge is stored in the liquid crystal capacitance of the liquid crystal layers 28 provided between the electrodes 24 and 27, and thus the display signal is written in a pixel corresponding to the liquid crystal capacitance. Even when the TFT 25 is turned to an OFF-state, a voltage applied during the ON-state of the TFT 25 is maintained by the charge in the liquid crystal capacitance.

Thus, pixels are driven over a field. Thereafter, in the same manner as above mentioned, the gate electrodes 23 are scanned successively and a gate signal is applied to each of the selected gate electrodes 23; source signals synchronized with the gate signals are applied to the source electrodes respectively; and consequently an image is formed on the display.

Next, an exemplary structure for the TFT is described referring to FIG. 14. FIG. 14 shows a cross-sectional structure of a portion of a conventional active matrix substrate, where the TFT is formed. A gate electrode 51 is formed on a glass substrate 50 as a transparent insulating substrate (corresponding to the insulating substrate 21 of FIGS. 13a and 13b). The gate electrode 51 is branched from gate electrodes arranged on the glass substrate 50. The gate electrodes and source electrodes (not shown) are arranged so as to cross each other. Each of a plurality of pixel electrodes 60 is provided at a rectangular region bounded by the gate and source electrodes, and thus the pixel electrodes 60 are arranged in a matrix. The gate electrode 51 is formed by patterning at the same time as when the gate electrodes are formed. Finally, the TFT provided with a source electrode 58 and a drain electrode 59 is formed on the gate electrode 51 via a gate insulating film 54.

Next will be described an exemplary structure and production method for the TFT in detail referring to FIG. 14. First, the gate insulating film 54 is formed on the gate electrode 51. Then, a semiconductor layer 52 is formed by patterning on the gate electrode 51 via the gate insulating film 54. Subsequently, an etching stopper layer 56 is formed on the semiconductor layer 52, and then contact layers 53a and 53b are formed by patterning so as to be adjacent to either side of the etching stopper layer 56. Finally, a source electrode 58 and a drain electrode 59 are respectively formed by patterning on the contact layers 53a and 53b, and thus the TFT is formed.

Next, an insulating protective film 55 (layer insulating film) is formed on the entire surface of the glass substrate 50 and covers the TFT. The pixel electrode 60 is formed by patterning a transparent conductive film such as an ITO (Indium Tin Oxide) film on the insulating protective film 55. The pixel electrode 60 is electrically connected to the drain electrode 59 through a contact hole 57 formed in the insulating protective film 55.

In a liquid crystal display using such a TFT, patterning of the semiconductor layer 52, the gate electrode 51, etc. requires photolithographic steps. The formation of the above-mentioned TFT requires 6 photolithographic steps including one step for forming the contact hole 57. Generally, a liquid crystal device provided with such a switching element requires 5 to 7 photolithographic steps, which makes the structure and the production process thereof complicated. Therefore, it is difficult to increase the production yield of the device, which leads to an expensive production cost.

As a switching element for the liquid crystal device, an MIM (metal-insulating layer-metal) element may be employed, which has a simpler structure than that of the TFT element and can be produced at low cost. However, the display employing the MIM element as the switching element thereof is inferior in display image quality to the device employing the TFT element due to the asymmetry of current-voltage properties. Recently, there has been a demand for larger-sized liquid crystal displays. However, it seems difficult to obtain larger-sized liquid crystal displays having high picture quality and high production yield at low cost with use of the conventional switching elements such as the TFT or MIM elements.

In order to produce large-sized liquid crystal displays at low cost, switching elements should be produced with high production yield at low cost. Thus, it is desirable to provide a switching element having a simple structure and production process.

It is therefore an object of the present invention to provide a switching element requiring less photolithographic steps than the prior art, thereby providing a liquid crystal display at a low unit cost.

SUMMARY OF THE INVENTION

In accordance with an aspect of the invention, the switching element array is provided between a plurality of first electrodes substantially arranged in parallel on a first insulating substrate in a first direction, and a plurality of second electrodes substantially arranged in parallel on a second insulating substrate facing the first insulating substrate in a second direction crossing the first direction. Each switching element of the switching element array is formed at a region sandwiched by one of the first electrodes and one of the second electrodes. The switching element comprises at least one first insulating layer provided on the first electrodes; at least one semiconductor layer provided on the first insulating layer; and at least one second insulating layer provided on the semiconductor layer. The said at least one semiconductor layer is electrically in a conductive state or in a non-conductive state in accordance with a voltage applied between the first and second electrodes.

The liquid crystal display of this invention comprises a first substrate including a first insulating substrate, and a plurality of first electrodes arranged on the first insulating substrate in a first direction; a second substrate facing the first substrate, including a second insulating substrate, and a plurality of second electrodes arranged on the second insulating substrate in a second direction crossing the first direction; a switching element array provided on the first substrate; and a liquid crystal layer provided between the first and second substrates. Each switching element of the switching element array is formed at a region sandwiched by one of the first electrodes and one of the second electrodes. The switching element comprises at least one first insulating layer provided on the first electrodes; at least one semiconductor layer provided on the first insulating layer; and at least one second insulating layer provided on the semiconductor layer. The said at least one semiconductor layer is electrically in a conductive state or in a non-conductive state in accordance with a voltage applied between the first and second electrodes.

In accordance with another aspect of the invention, the liquid crystal display comprises a first substrate including a first insulating substrate, and a plurality of first electrodes arranged on the first insulating substrate in a first direction; a second substrate facing the first substrate, including a second insulating substrate, and a plurality of second electrodes arranged on the second insulating substrate in a second direction crossing the first direction; a switching element array provided on the first substrate; a liquid crystal layer provided between the first and second substrates; and a plurality of pixel electrodes formed between the switching element array and the liquid crystal layer. The first electrodes each have a branch portion; the pixel electrodes each have a portion overlaid with the branch portion; and each switching element of the switching element array is formed at a region sandwiched by the branch portion of each first electrode and the portion of each pixel electrode. The switching element comprises at least one first insulating layer provided on the first electrodes; at least one semiconductor layer provided on the first insulating layer; and at least one second insulating layer provided on the semiconductor layer. The said at least one semiconductor layer is electrically in a conductive state or in a non-conductive state in accordance with a voltage applied between the first and second electrodes.

The switching element array of this invention is provided between a plurality of first electrodes substantially arranged in parallel on a first insulating substrate in a first direction, and a plurality of second electrodes substantially arranged in parallel on a second insulating substrate facing the first insulating substrate in a second direction crossing the first direction. Each switching element of the switching element array comprises a plurality of scan electrodes branched from the first electrodes; at least one first insulating layer provided so as to cover the scan electrodes; at least one semiconductor layer provided on the first insulating layer; and at least one second insulating layer provided on the semiconductor layer. The said at least one semiconductor layer is electrically in a conductive state or in a non-conductive state in accordance with a voltage applied between the first and second electrodes, and consists of a plurality of independent regions each corresponding to each switching element of the switching element array.

In accordance with still another aspect of the invention, the liquid crystal display comprises a second substrate including a first insulating substrate, and a plurality of first electrodes arranged on the first insulating substrate in a first direction; a second substrate facing the first substrate, including a second insulating substrate, and a plurality of second electrodes arranged on the second insulating substrate in a second direction crossing the first direction; a switching element array provided on the first substrate; a liquid crystal layer provided between the first and second substrates; and a plurality of transparent pixel electrodes each connected to a switching element of the switching element array. Each switching element of the switching element array comprises a plurality of scan electrodes branched from the first electrodes; at least one first insulating layer provided on the first electrodes and the scan electrodes; at least one semiconductor layer provided on the first insulating layer; and at least one second insulating layer provided on the semiconductor layer. The said at least one semiconductor layer is electrically in a conductive state or in a non-conductive state in accordance with a voltage applied between the first and second electrodes, and consists of a plurality of independent regions each corresponding to each switching element of the switching element array.

As is described above, according to the present invention, the formation of the switching element array requires no patterning step, or a single patterning step. Therefore, by using the switching element array of the present invention, a liquid crystal display can be produced by using 2 to 5 photolithographic steps. Therefore the production yield of the liquid crystal display can be improved compared with that of the conventional liquid crystal display which requires 6 to 7 photolithographic steps. Therefore, the large-sized liquid crystal display can be obtained at low cost.

Thus, the invention described herein makes possible the advantages of (1) providing a switching element array at low cost; and (2) providing a large-sized liquid crystal display at low cost by using the switching element.

These and other advantages of the present invention will become apparent to those skilled in the art upon reading and understanding the following detailed description with reference to the accompanying figures.

BRIEF DESCRIPTION OF THE DRAWINGS

FIG. 13b is a cross-sectional view corresponding to FIG. 13a.

DESCRIPTION OF THE PREFERRED EMBODIMENTS

The present invention will be described in detail by way of illustrating examples.

Example 1

Figure 1:
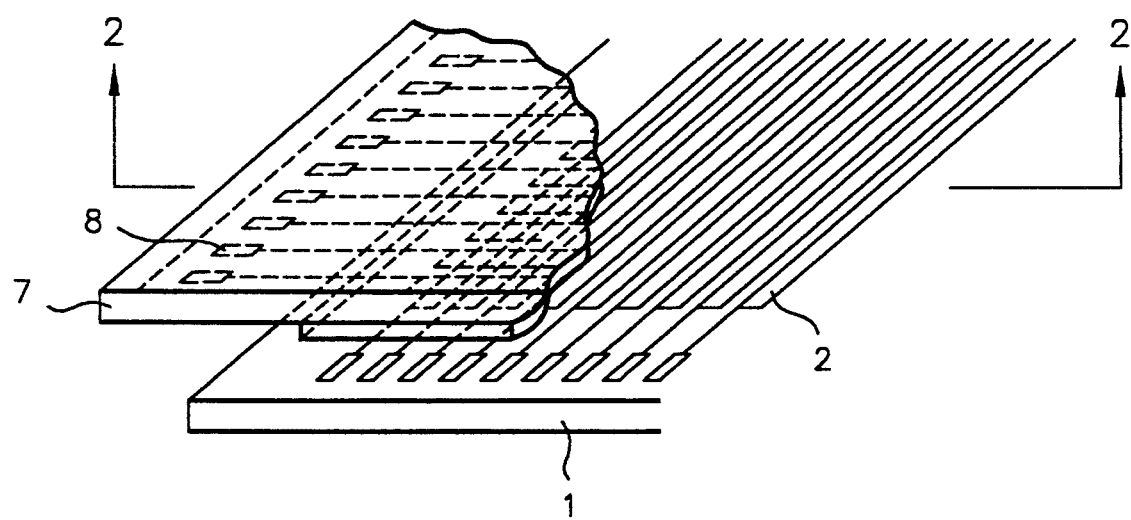
FIG. 1 is a perspective view showing an active matrix substrate according to a first example of the present invention.
Figure 2:
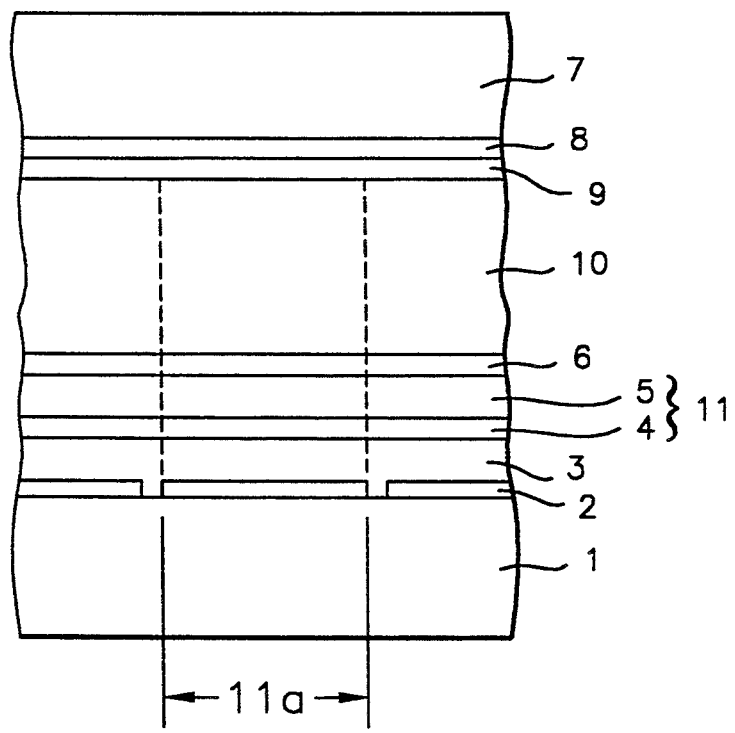
FIG. 2 is a cross-sectional view taken along the line 2—2' in FIG. 1.

FIG. 1 shows a perspective view of a liquid crystal display according to a first example of the present invention. FIG. 2 shows a cross-sectional view taken along the line 2—2' in FIG. 1. In the liquid crystal display, a liquid crystal layer 10 provided between a transparent insulating substrate t and a counter substrate 7 is sealed by seal resin. A plurality of first electrodes 2 are arranged in parallel on the transparent insulating substrate 1 in a first direction, and a first insulating layer 3 made of $Ta_2O_5$ (thickness: 0.5 μm) is formed on the entire surface of the transparent insulating substrate 1 and covers the first electrodes 2. A semiconductor layer 4 made of ZnS (thickness: 0.15 μm) and a second insulating layer 5 made of $Ta_2O_5$ (thickness: 0.5 μm) are formed on the first insulating layer 3 in this order. The triple-layered structure of the first insulating layer 3, the semiconductor layer 4, and the second insulating layer 5 constitute a switching element array 11. An orientation film 6 is formed on the entire surface of the substrate 1 and covers the second insulating layer 5.

A plurality of second electrodes 8 are formed on the counter substrate 7, and arranged in parallel in a second direction crossing the first direction at right angles. An orientation film 9 is formed on the counter substrate 7 and fully covers the second electrodes 8. Each rectangular region sandwiched by one of the first electrodes 2 and one of the second electrodes 8 corresponds to a pixel. The pixel is operated by each corresponding switching element of the switching element array 11.

Figure 3:
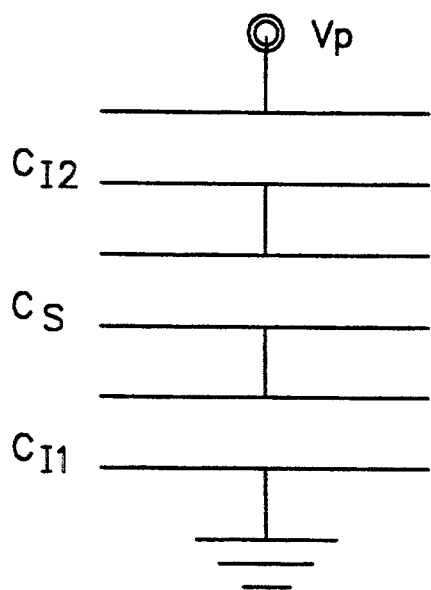
FIG. 3 is an equivalent circuit diagram of a switching element having a triple-layered structure according to the first example of the present invention.

As is described above, each switching element of the switching element array according to the present invention has a triple-layered structure made of the first insulating layer, the semiconductor layer, and the second insulating layer. Each layer can be made as a single layer or a multi-layer. When a voltage applied to the switching element is lower than a threshold voltage peculiar to the semiconductor layer, an equivalent circuit of the switching element is a circuit which has three serially connected capacitors as shown in FIG. 3. Herein, the first insulating layer 3, the semiconductor layer 4, and the second insulating layer 5 correspond to capacitors $C_{I1}$, $C_S$, and $C_{I2}$, respectively.

Figure 4:
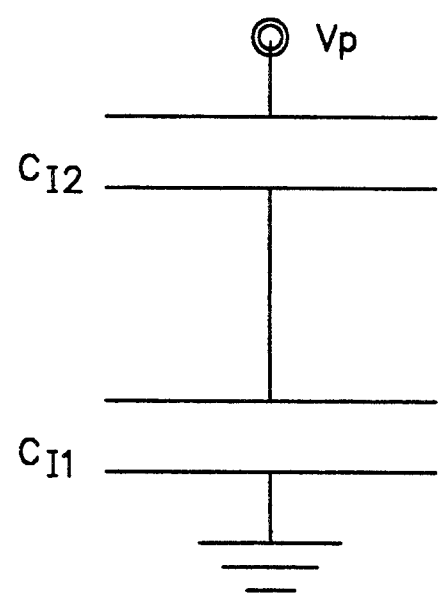
FIG. 4 is an equivalent circuit diagram of the switching element in which a voltage higher than a threshold voltage is applied to a semiconductor layer.
Figure 5:
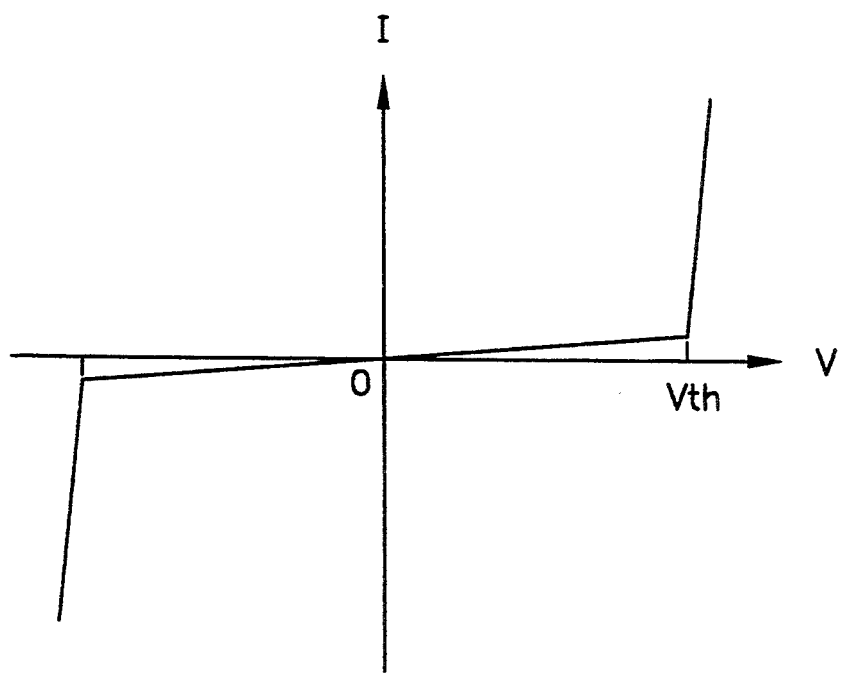
FIG. 5 is a graph showing the relationship between the current and the voltage of the semiconductor layer.

As is shown in FIG. 5, when a voltage V applied to the semiconductor layer is higher than the threshold voltage, electrons in the semiconductor layer cause impact ionization, so that the I-V curve comes to extend almost vertically. That is, when a voltage higher than the threshold voltage $V_{th}$ is applied, the semiconductor layer becomes conductive (i.e., the switching element switches to the ON-state). As a result, the equivalent circuit of the switching element is a circuit which has two serially connected capacitors as shown in FIG. 4. A charge Q is stored in the interface between the insulating layer and the semiconductor layer while the voltage V is applied to the equivalent circuit. The charge Q can be determined as follows (herein both of the capacitances of the first and second insulating layers are assumed to be $C_I$):

$$Q = \frac{C_I \times C_I}{C_I + C_I} V = \frac{1}{2} C_I V$$

The charge Q is trapped in the interface between the semiconductor layer and the insulating layer, so that a polarized voltage can be maintained by the charge Q even when the voltage is not applied after the charge Q is trapped. Thus, a display signal can be written in each pixel of the liquid crystal display by utilizing a switching element having this triple-layered structure.

Hereinafter will be described the operation of a liquid crystal display in which the liquid crystal layer 10 is arranged on the switching element array 11.

Figure 6:
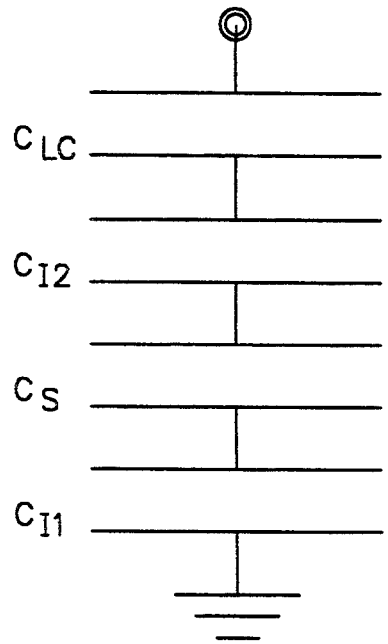
FIG. 6 is an equivalent circuit diagram of the liquid crystal layer and the switching element.
Figure 7:
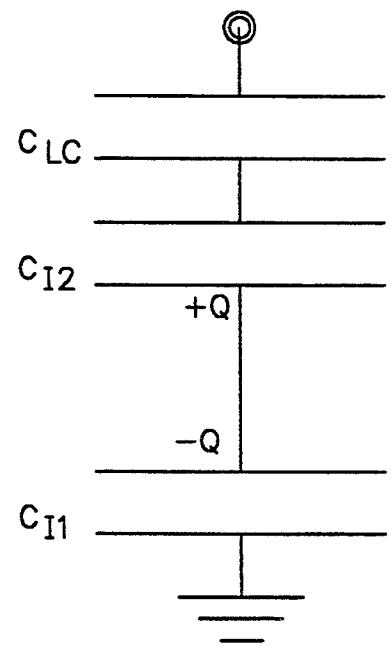
FIG. 7 is an equivalent circuit diagram of the liquid crystal layer and the switching element in cases where a voltage higher than a threshold voltage is applied to the semiconductor layer.
Figure 8:
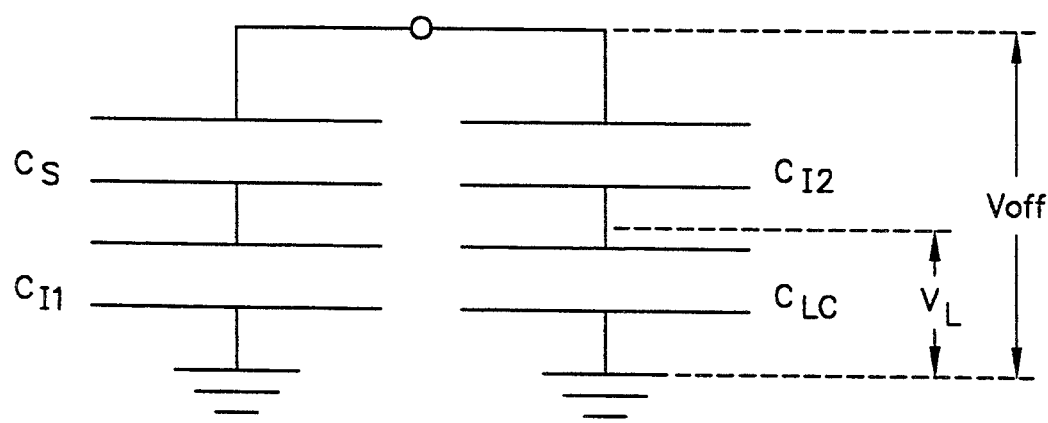
FIG. 8 is an equivalent circuit diagram of the liquid crystal layer and the switching element with no voltage applied after charging the liquid crystal layer.

As is shown in FIG. 6, an equivalent circuit of the liquid crystal layer 10 and the switching element is a circuit which has a capacitor $C_{LC}$ corresponding to the liquid crystal layer 10 and three serially connected capacitors corresponding to the switching element connected to the capacitor $C_{LC}$. In cases where a voltage $V_p$ is applied to the equivalent circuit, and a voltage higher than the threshold voltage $V_{th}$ is applied to the semiconductor layer 4, the semiconductor layer 4 enters a conductive-state (FIG. 7). A charge Q generated in the semiconductor layer 4 is trapped in an interface between the semiconductor layer 4 and the first insulating layer 3, and in an interface between the semiconductor layer 4 and the second insulating layer 5. Therefore, the charge Q can remain as a polarized charge Q even after the application of the voltage $V_p$ is stopped, so that a voltage $V_{off}$ is maintained by the charge Q in the equivalent circuit as is shown in FIG. 8. A partial voltage $V_L$ of the voltage $V_{off}$ is maintained in the liquid crystal capacitance $C_{LC}$ serially connected to the switching element. Liquid crystal displays according to the other examples described later are operated in the same manner as described above.

The liquid crystal display using the switching element array 11 is operated as follows (herein, it is assumed that a gate signal is applied to the first electrodes 2 and a source signal is applied to the second electrodes 8):

First, one of the first electrodes 2 is selected and a gate signal is applied to the selected first electrode 2. Simultaneously, a source signal is applied to the second electrodes 8 on the counter substrate 7. In a region sandwiched by the selected first electrode 2 and the second electrode 8, the total voltage $V_p$ of the first and second electrodes 2 and 8 is applied to a corresponding pixel. The voltage to be applied to the semiconductor layer 4 of the switching element is a partial voltage $V_s$ of the voltage $V_p$. Each voltage of the gate signal and the source signal should be set so that the partial voltage $V_s$ is higher than the threshold value $V_{th}$ where impact ionization occurs. As a result, the switching element turns to an ON-state, and the partial voltage $V_L$ is applied to the liquid crystal layer 10 connected to the switching element, and consequently the display signal is written into the liquid crystal layer 10.

During the time when no pixel is selected, i.e., when the switching element is in the OFF-state, the voltage of the liquid crystal layer 10 is maintained by the polarized charge Q remaining in the switching element. Such an operation is performed for each pixel, and thus an image is formed on the display.

For manufacturing a liquid crystal display using such a switching element array, only two photolithographic steps are required; one is for forming the first electrodes 2, and the other is for forming the second electrodes 8. With less photolithographic steps compared with the case of a conventional display where 5 to 7 photolithographic steps are required, the display of the present example can be produced with high production yield at low cost.

The material of the above insulating layer is not limited to $Ta_2O_5$, but the other compounds may be used, such as GeO, $GeO_2$, $TiO_2$, $Al_2O_3$, $Y_2O_3$, $SiN_x$, and AlN. The material of the semiconductor layer 4 is not limited to ZnS, but the other group II-VI compounds having a good polarization property, especially ZnSe, ZnTe, ZnO, CdSe, and CdTe which have a good transparent property may be used. Furthermore, amorphous silicon and polysilicon can also be used for the semiconductor layer 4.

By changing the materials and thicknesses of the insulating layers and the semiconductor layer, it is possible to adjust the capacitance ratio of the liquid crystal capacitance to the capacitance of the switching element of the pixel and/or the voltage ratio of the voltage $V_{off}$ to the partial voltage $V_L$.

Example 2

Figure 9A:
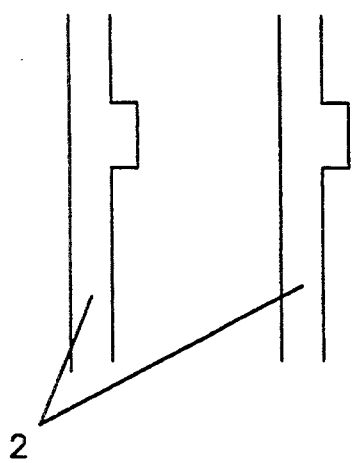
FIGS. 9a to 9c are plan views showing how a liquid crystal display is produced according to a second example of the present invention.
Figure 9D:
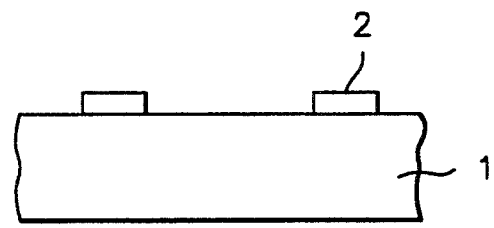
FIGS. 9d to 9f are cross-sectional views corresponding to FIGS. 9a to 9c, respectively.
Figure 9B:
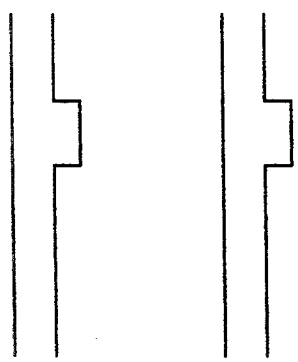
Figure 9E:
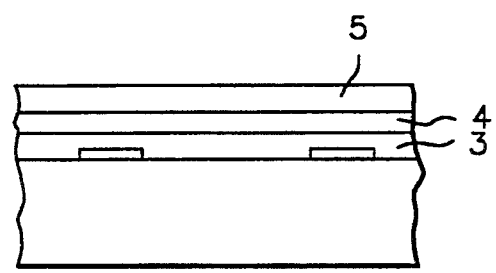
Figure 9C:
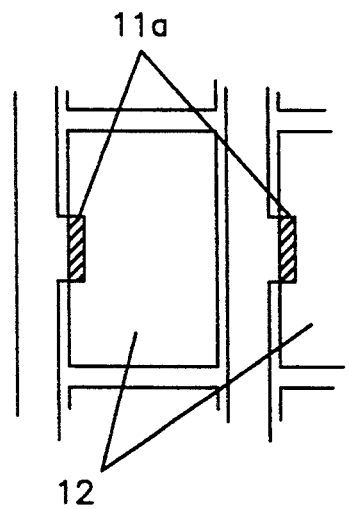
Figure 9F:
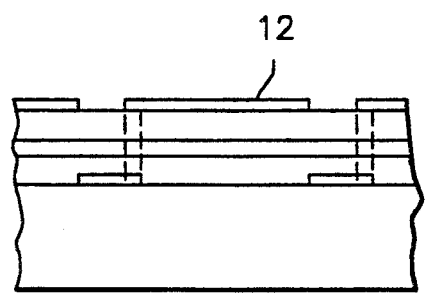
Figure 9G:
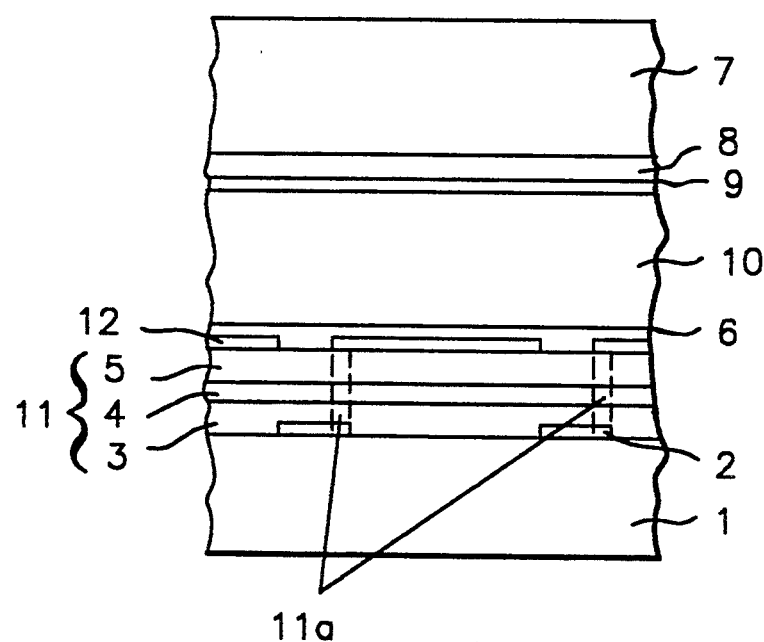
FIG. 9g is a cross-sectional view of the liquid crystal display manufactured through the steps shown in FIGS. 9a to 9c and 9d to 9f.

FIG. 9g shows a cross-sectional view of a liquid crystal display according to a second example of the present invention. A liquid crystal layer 10 provided between a transparent insulating substrate 1 and a counter substrate 7 is sealed by seal resin. A plurality of first electrodes 2 are arranged in parallel on a transparent insulating substrate 1 in a first direction, and each of the first electrodes 2 has a branch electrode. A first insulating layer 3 made of $Ta_2O_5$ (thickness: 0.5 μm) is formed on the entire surface of the transparent insulating substrate 1 and covers the first electrodes 2. A semiconductor layer 4 made of ZnS (thickness: 0.15 μm) and a second insulating layer 5 made of $Ta_2O_5$ (thickness: 0.5 μm) are formed on the first insulating layer 3 in this order. A plurality of pixel electrodes 12 are formed on the second insulating film 5. Each pixel electrode 12 is partially superimposed over the branch electrode branched from the first electrodes 2. Thus, the switching element array 11 consists of a plurality of triple-layered structures 11a which are formed in respective regions sandwiched by the pixel electrodes and the corresponding branch electrodes with three layers of the first insulating layer 3, the semiconductor layer 4, and the second insulating layer 5. Herein, each of the layers 3, 4, and 5 can be made as a single layer or a multi-layer.

An orientation film 6 is formed on the entire surface of the substrate 1 and covers the second insulating layer 5. A plurality of second electrodes 8 are formed on the counter substrate 7 facing the insulating substrate 1 in a second direction crossing the first direction at right angles. An orientation film 9 is formed on the entire surface of the counter substrate 7 and covers the second electrodes 8.

Next will be described several steps of an exemplary production process of the liquid crystal display according to the present invention referring to FIGS. 9a to 9f. FIGS. 9a to 9c show plan views of the liquid crystal display at each step. FIGS. 9d to 9f show cross-sectional views corresponding to FIGS. 9a to 9c, respectively.

First, a conductive thin film is deposited on the insulating substrate 1 made of glass, etc. with a sputtering method or a CVD method, and then is patterned into a desired shape, thereby forming the first electrodes 2 (see FIGS. 9a and 9d).

Second, the first insulating layer 3, the semiconductor layer 4, and the second insulating layer 5 are deposited on the first electrodes 2 in this order with prescribed thicknesses respectively (see FIGS. 9b and 9e).

Third, a conductive thin film is formed on the second insulating layer 5, and then is patterned into a desired shape, thereby forming the pixel electrodes 12 (see FIGS. 9c and 9f). Shaded portions of FIG. 9c, and portions encircled by dotted lines of FIGS. 9f and 9g are portions where the pixel electrodes 12 are superimposed over the branch electrodes branched from the first electrodes 2. At these portions, the switching elements 11a are formed.

According to the present example, the switching elements 11a are formed at portions where the pixel electrodes 12 are superimposed over the branch electrodes branched from the first electrodes 2. Therefore, in the pixel electrode 12, an area of the pixel region and an area of the switching element region can independently be determined. As a result, these areas can respectively be varied in order to adjust the capacitance ratio of the liquid crystal capacitance to the capacitance of the switching element of the pixel and/or the voltage ratio of the voltage $V_{off}$ to the partial voltage $V_L$.

Therefore, according to the present example, the degree of freedom for adjusting the capacitance ratio and/or the voltage ratio can be increased compared with the first example in which such a ratio is adjusted only by changing the material or thickness of each layer. The present example has further advantage that the productivity is improved compared with the case where such a ratio is adjusted by changing the thickness of each layer.

Compared with the first example, the present example has one more photolithographic step for patterning the pixel electrode 12, but has an advantage that the switching element 11a can be formed without limitation in the material and thickness of each layer.

Example 3

Figure 10:
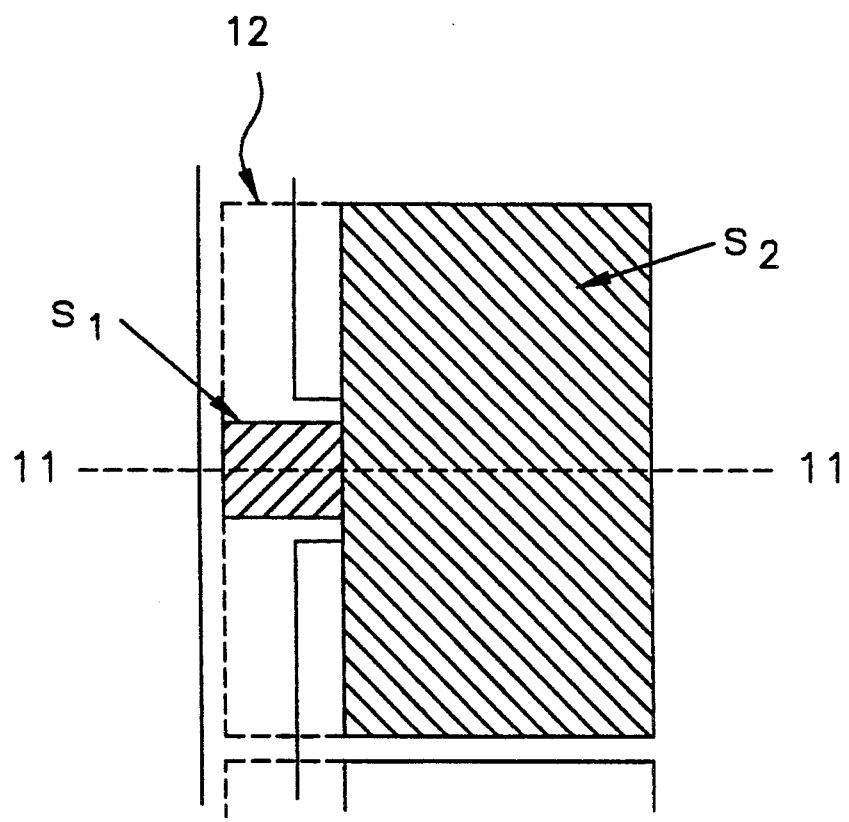
FIG. 10 is a partial plan view of a switching element array according to a third example of the present invention.
Figure 11:
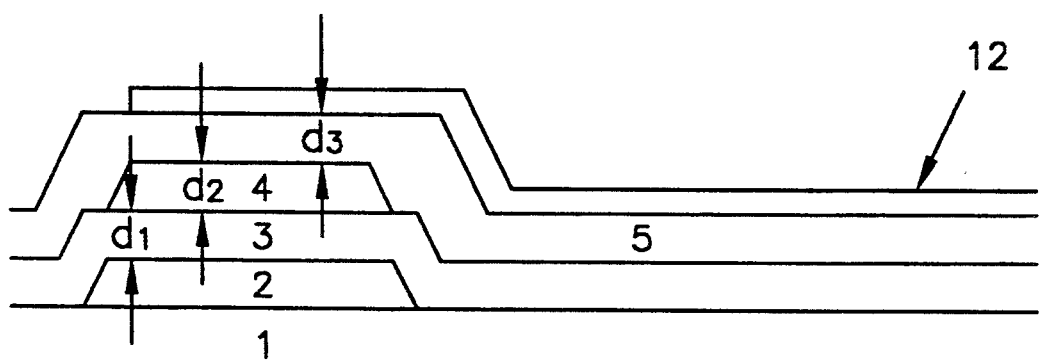
FIG. 11 is a cross-sectional view taken along the line B—B' in FIG. 10.
Figure 12:
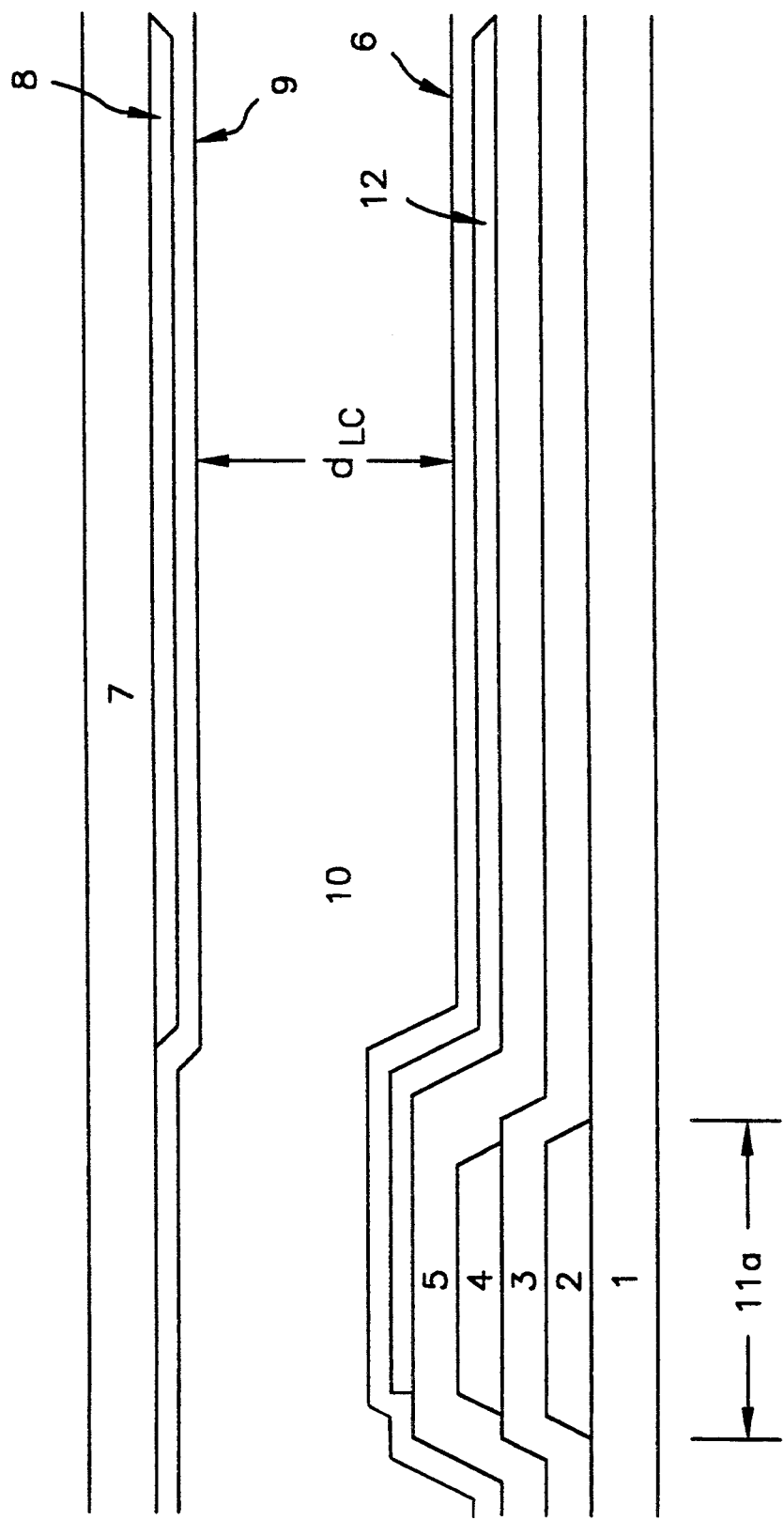
FIG. 12 is a cross-sectional view of a liquid crystal display using the switching element array of FIG. 10.
Figure 13A:
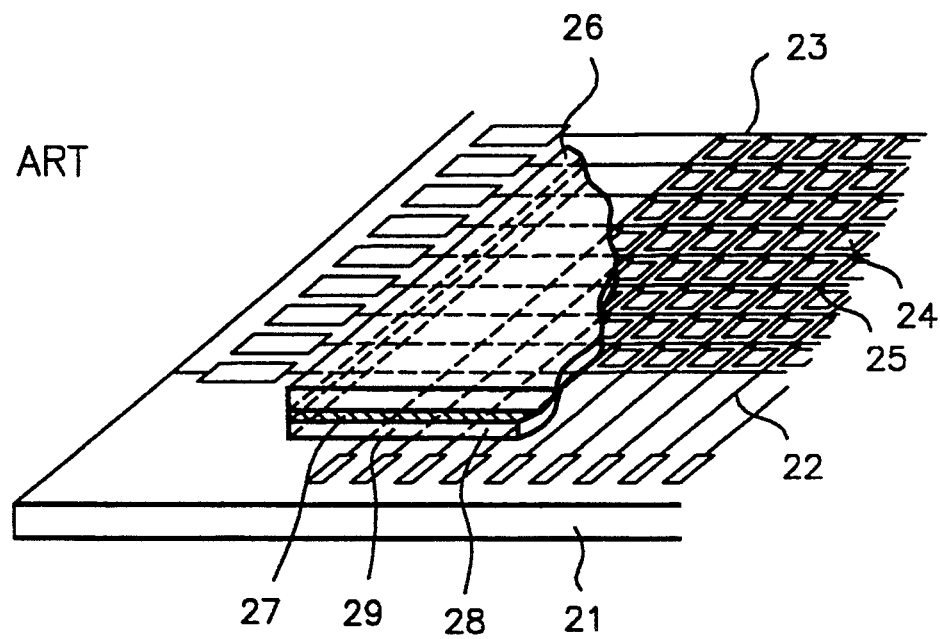
FIG. 13a is a perspective view of a conventional liquid crystal display employing an active matrix system.
Figure 13B:
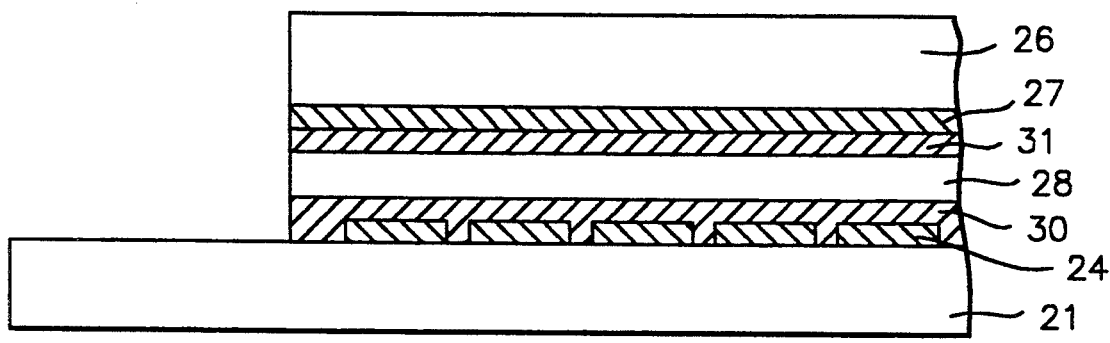
Figure 14:
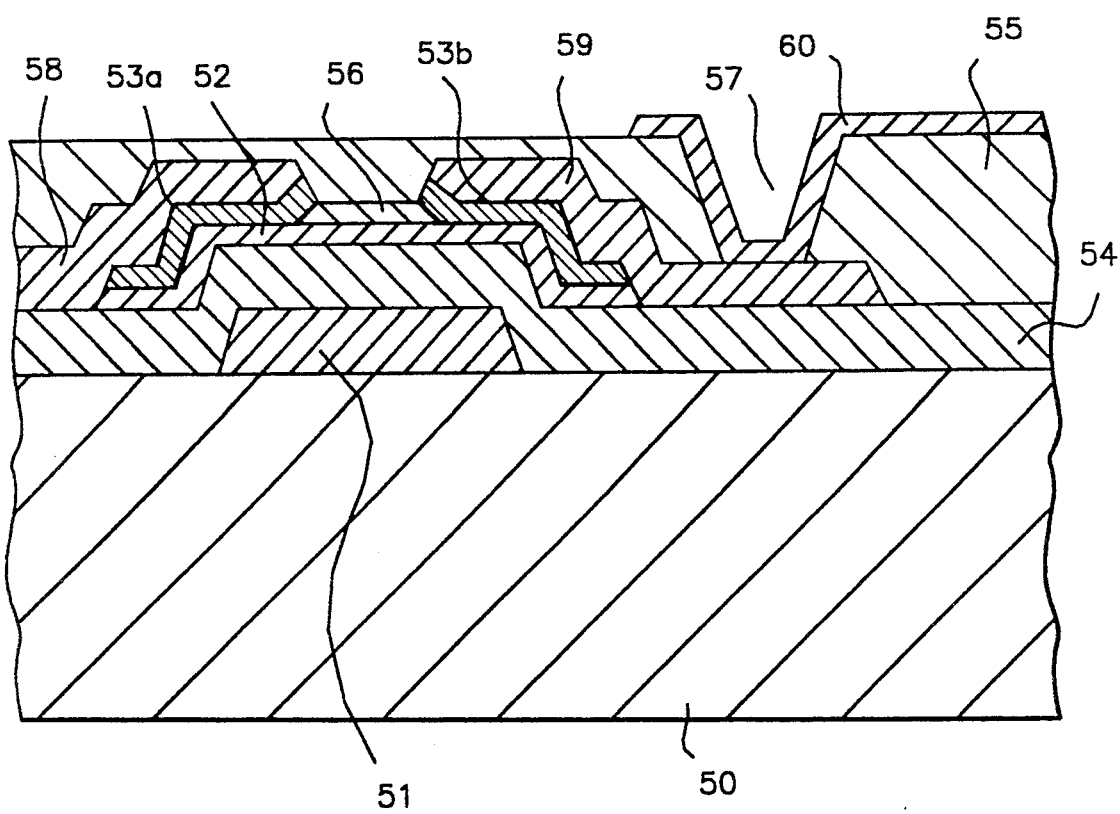
FIG. 14 is a cross-sectional view of a conventional active matrix substrate comprising a TFT element.

FIG. 10 is a partial plan view of a switching element array according to a third example of the present invention. FIG. 11 is a cross-sectional view taken along the line B—B' in FIG. 10. FIG. 12 is a cross-sectional view of a liquid crystal display using the switching element array of FIG. 10.

Hereinafter, the liquid crystal display according to the present example will be described referring to FIG. 12. A liquid crystal layer 10 provided between a transparent insulating substrate 1 and a counter substrate 7 is sealed by seal resin. A plurality of first electrodes 2 are arranged in parallel on the transparent insulating substrate 1, and each of the first electrodes 2 has a branch electrode. A first insulating layer 3 is formed on the entire surface of the transparent insulating substrate 1 and covers the first electrodes 2. A semiconductor layer 4 is formed on the first insulating layer 3 and patterned into a prescribed shape. A second insulating layer 5 is formed and covers the entire surface of the substrate 1. A plurality of transparent pixel electrodes 12 are formed on the second insulating layer 5. Each transparent pixel electrode 12 is partially superimposed over the semiconductor layer 4. Thus, the switching element array 11 consists of a plurality of triple-layered structures 11a which are formed in corresponding regions sandwiched by the transparent pixel electrodes 12 and the portions of the first electrodes 2 respectively. An area $S_1$ shown in FIG. 10 corresponds to the switching element. Herein, each of the layers 3, 4 and 5 can be made as a single layer or a multilayer.

An orientation film 6 is formed on the entire surface of the substrate 1 and covers the second insulating layer 5 and the transparent pixel electrode 12. Second electrodes 8 are formed on the counter substrate 7 facing the insulating substrate 1, and an orientation film 9 is formed on the entire surface of the substrate 7 and covers the second electrodes 8. The second electrodes 8 are formed so as to superimpose over the transparent pixel electrodes 12 respectively. An area $S_2$ shown in FIG. 10 corresponds to an area where the second electrode 8 is formed. The area $S_2$ constitutes a pixel.

Next will be described several steps of an exemplary production process of the switching element array according to the present invention referring to FIG. 11.

First, a conductive thin film made of Ta, etc. is deposited on the insulating substrate 1 made of glass, etc. by a sputtering method or a CVD method, and then is patterned into a desired shape, thereby forming the first electrodes 2. The first electrodes 2 each have a branch portion (gate electrode). Next, a first insulating layer 3 is deposited on the first electrodes 2. Next, a semiconductor layer 4 is disposed on the first insulating layer 3, and patterned into a desired shape. Then, a second insulating layer 5 is deposited and covers the semiconductor layer 4. Subsequently, a conductive thin film made of ITO, etc is formed on the second insulating layer 5, and is patterned into a prescribed shape so as to be partially superimposed over the semiconductor layer 4, thereby forming transparent pixel electrodes 12. The semiconductor layer 4 is divided into a plurality of regions, and each region corresponds to a switching element, and is located over the gate electrode branched from the first electrodes 2.

The reason why the semiconductor layer 4 is formed only on portions of the second insulating layer 5 corresponding to the gate electrode is as follows: In cases where the semiconductor layer 4 is formed not only on the portions, but on the entire surface of the second insulating layer 5, an active layer is formed between the semiconductor layer 4 and the second insulating layer 5 when a charge is stored in the transparent pixel electrode 12. Then, a leakage current may occur between the pixels, and unnecessary capacitance may be formed between the liquid crystal layer 10 and the semiconductor layer 4 below the transparent pixel electrode 12. Therefore, sufficient voltage cannot be applied to the liquid crystal layer 10. However, according to such a structure in which the semiconductor layer 4 is formed only on the portions of the second insulating layer 5 corresponding to the gate electrodes, sufficient voltage can be applied to the liquid crystal layer 10.

Next will be described an operation of the liquid crystal display using the above-mentioned switching element array.

In cases where a voltage $V_p$ applied between the gate electrode branched from the first electrode 2 and the second electrode 8 is less than a threshold voltage $V_{th}$, an equivalent circuit of the liquid crystal layer and the switching element consists of four capacitors as is shown in FIG. 6. On the other hand, in cases where the voltage $V_p$ is higher than the threshold voltage $V_{th}$ and impact ionization occurs, a charge Q is trapped in the interface between the insulating layer and the semiconductor layer as is shown in FIG. 7. Therefore, even after the application of the voltage $V_p$ is stopped, the voltage can be maintained by the trapped charge Q. Herein, the equivalent circuit is a parallel circuit of capacitances where first capacitances corresponding to the first insulating layer and the semiconductor layer are connected to second capacitances corresponding to the second insulating layer and the liquid crystal layer as is shown in FIG. 8. The second capacitances are divided between a capacitance of the second insulating layer and a capacitance of the liquid crystal layer. A partial voltage $V_L$ can be held in the liquid crystal layer by the divided capacitance even after the application of the voltage is stopped.

Accordingly, properties of the capacitances of the insulating layer, the semiconductor layer, and the liquid crystal layer influence the value of the partial voltage $V_L$ to be stored in the liquid crystal layer. That is, a combination of the following factors is very important: a thickness and a dielectric constant of the insulating layer; a thickness, a dielectric constant, and a threshold voltage of the semiconductor layer; an area of the switching element; a dielectric constant, a cell gap, and a threshold voltage of the liquid crystal layer; and an area of the transparent electrode.

The relationship among the above factors will be described, assuming that the first insulating layer and the second insulating layer are made of the same material and in both a thickness $d_1$ of the first insulating layer and a thickness $d_3$ of the second insulating layer are the same thickness $d_I$. The relationship between the voltage $V_p$ to be applied between the first electrodes 2 and the second electrode 8 and the voltage $V_L$ to be maintained in the liquid crystal layer after the application of the voltage Vp is stopped can approximately be represented by the following formula (herein $C_E$, $C_L$, $C_I$, and $C_S$ represent the capacitances of the switching element, the liquid crystal layer, the insulating layer, and the semiconductor layer, respectively; and $\alpha$ and $\beta$ represent $C_E/C_L$ and $C_I/C_S$, respectively):

$$V_L = AV_P$$

$$A = \frac{\alpha\beta}{(\alpha + 1)(2 + 2\alpha + \alpha\beta)}$$

The relationship between the threshold voltage $V^{th}_L$ of the liquid crystal layer and the threshold voltage $V^{th}_S$ for causing impact ionization in the semiconductor layer can approximately be represented by the following formula (herein $d_2$ represents the thickness of the semiconductor layer, $\epsilon_S$ represents the dielectric constant of the semiconductor layer, $d_I$ represents the thickness of each insulating layer, and $\epsilon_I$ represents the dielectric constant of each insulating layer):

$$V^{th}_S \leq \frac{V^{th}_L}{d_s \times A \times B}$$

$$B = \frac{(\alpha + 1)(\beta + 2)}{\beta}$$

$$d_I = \frac{1}{\beta} \frac{\epsilon_I}{\epsilon_s} d_2$$

The area $S_1$ of the switching element can approximately be determined as follows (herein $\epsilon_o$ represents a dielectric constant in the vacuum):

$$S = \frac{d_2}{\epsilon_o \epsilon_s} \times \frac{\alpha(2 + \beta)}{\beta} C_L$$

Next will be described examples where a liquid crystal display is produced according to the present invention utilizing the above formulas referring to FIGS. 10 and 11. Herein, the liquid crystal layer is made of a TN liquid crystal having a threshold voltage of 5V. The cell gap $d_{LC}$ and the pixel area $S_2$ are set to 5 $\mu$m and 110 $\mu$m×330 $\mu$m, respectively.

(1) The first and second insulating layers made of $TiO_2$ are each formed by sputtering so as to have a thickness of 1500 to 2500 Å, and the semiconductor layer made of a ZnS film is formed by sputtering so as to have a thickness of 500 to 1500 Å. The switching element area $S_1$ is set to 20 $\mu$m×47 $\mu$m. In this case, the liquid crystal display can be driven by applying a voltage of about 50V.

(2) The first and second insulating layers made of $TiO_2$ are each formed by sputtering so as to have a thickness of 4500 to 5500 Å, and the semiconductor layer made of ZnS is formed by sputtering so as to have a thickness of 1000 to 2000 Å. The switching element area $S_1$ is set to 40 $\mu$m×45 $\mu$m. In this case, the liquid crystal display can be driven by applying a voltage of about 80V.

(3) The first and second insulating layers made of $TiO_2$ are each formed by sputtering so as to have a thickness of 2500 to 3500 Å, and the semiconductor layer made of ZnS is formed by sputtering so as to have a thickness of 1000 to 2000 Å. The switching element area $S_1$ is set to 35 $\mu$m×40 $\mu$m. In this case, the liquid crystal display can be driven by applying a voltage of about 50V.

(4) The first and second insulating layers made of $TiO_2$ are each formed by sputtering so as to have a thickness of 1000 to 2000 Å, and the semiconductor layer made of ZnS is formed by sputtering so as to have a thickness of 1000 to 2000 Å. The switching element area $S_1$ is set to 35 $\mu$m×40 $\mu$m. In this case, the liquid crystal display can be driven by applying a voltage of about 50V.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A switching element array provided between a plurality of first electrodes substantially arranged in parallel on a first insulating substrate in a first direction, and a plurality of second electrodes substantially arranged in parallel on a second insulating substrate facing the first insulating substrate in a second direction crossing the first direction;
    wherein each switching element of the switching element array is formed at a region sandwiched by one of the first electrodes and one of the second electrodes;
    the switching element comprises: at least one first insulating layer provided on the first electrodes, at least one semiconductor layer provided on the first insulating layer, and at least one second insulating layer provided on the semiconductor layer; and
    the at least one semiconductor layer is electrically in a conductive state or in a non-conductive state in accordance with a voltage applied between the first and second electrodes.

2. A liquid crystal display comprising:
    a first substrate including a first insulating substrate, and a plurality of first electrodes arranged on the first insulating substrate in a first direction, a second substrate facing the first substrate, including a second insulating substrate, and a plurality of second electrodes arranged on the second insulating substrate in a second direction crossing the first direction, a switching element array provided on the first substrate, and a liquid crystal layer provided between the first and second substrates;

wherein each switching element of the switching element array is formed at a region sandwiched by one of the first electrodes and one of the second electrodes;

the switching element comprises: at least one first insulating layer provided on the first electrodes, at least one semiconductor layer provided on the first insulating layer, and at least one second insulating layer provided on the semiconductor layer; and the at least one semiconductor layer is electrically in a conductive state or in a non-conductive state in accordance with a voltage applied between the first and second electrodes.

3. A liquid crystal display comprising:

a first substrate including a first insulating substrate, and a plurality of first electrodes arranged on the first insulating substrate in a first direction, a second substrate facing the first substrate, including a second insulating substrate, and a plurality of second electrodes arranged on the second insulating substrate in a second direction crossing the first direction, a switching element array provided on the first substrate, a liquid crystal layer provided between the first and second substrates, and a plurality of pixel electrodes formed between the switching element array and the liquid crystal layer;

wherein the first electrodes each have a branch portion;

the pixel electrodes each have an overlaid portion which is overlaid with the branch portion;

each switching element of the switching element array is formed at a region sandwiched by the branch portion of each first electrode and the overlaid portion of each pixel electrode;

the switching element comprises: at least one first insulating layer provided on the first electrodes, at least one semiconductor layer provided on the first insulating layer, and at least one second insulating layer provided on the semiconductor layer; and the at least one semiconductor layer is electrically in a conductive state or in a non-conductive state in accordance with a voltage applied between the first and second electrodes.

4. A switching element array provided between a plurality of first electrodes substantially arranged in parallel on a first insulating substrate in a first direction, and a plurality of second electrodes substantially arranged in parallel on a second insulating substrate facing the first insulating substrate in a second direction crossing the first direction;

wherein each switching element of the switching element array comprises: a plurality of scan electrodes branched from the first electrodes, at least one first insulating layer provided so as to cover the scan electrodes, at least one semiconductor layer provided on the first insulating layer, and at least one second insulating layer provided on the semiconductor layer;

the at least one semiconductor layer is electrically in a conductive state or in a non-conductive state in accordance with a voltage applied between the first and second electrodes; and the at least one semiconductor layer consists of a plurality of independent regions each corresponding to each switching element of the switching element array.

5. A switching element array according to claim 4, wherein the independent regions of the semiconductor layer are formed only over the scan electrodes, respectively.

6. A liquid crystal display comprising:

a first substrate including a first insulating substrate, and a plurality of first electrodes arranged on the first insulating substrate in a first direction, a second substrate facing the first substrate, including a second insulating substrate, and a plurality of second electrodes arranged on the second insulating substrate in a second direction crossing the first direction, a switching element array provided on the first substrate, a liquid crystal layer provided between the first and second substrates, and a plurality of transparent pixel electrodes each connected to a switching element of the switching element array;

wherein each switching element of the switching element array comprises: a plurality of scan electrodes branched from the first electrodes, at least one first insulating layer provided on the first electrodes and the scan electrodes, at least one semiconductor layer provided on the first insulating layer, and at least one second insulating layer provided on the semiconductor layer;

the at least one semiconductor layer is electrically in a conductive state or in a non-conductive state in accordance with a voltage applied between the first and second electrodes; and the at least one semiconductor layer consists of a plurality of independent regions each corresponding to each switching element of the switching element array.

7. A switching element array according to claim 6, wherein the independent regions of the semiconductor layer are formed only over the scan electrodes, respectively.

8. A switching element array according to claim 1, wherein the material of the semiconductor layer is selected from the group consisting of a group II–VI compound, a Zn compound, a Cd compound, and amorphous silicon.

9. A liquid crystal display according to claim 2, wherein the material of the semiconductor layer is selected from the group consisting of a group II–VI compound, a Zn compound, a Cd compound, and amorphous silicon.

10. A liquid crystal display according to claim 3, wherein the material of the semiconductor layer is selected from the group consisting of a group II–VI compound, a Zn compound, a Cd compound, and amorphous silicon.

11. A switching element array according to claim 4, wherein the material of the semiconductor layer is selected from the group consisting of a group II–VI compound, a Zn compound, a Cd compound, and amorphous silicon.

12. A switching element array according to claim 5, wherein the material of the semiconductor layer is selected from the group consisting of a group II–VI compound, a Zn compound, a Cd compound, and amorphous silicon.

13. A liquid crystal display according to claim 6, wherein the material of the semiconductor layer is selected from the group consisting of a group II–VI compound, a Zn compound, a Cd compound, and amorphous silicon.

14. A liquid crystal display according to claim 7, wherein the material of the semiconductor layer is selected from the group consisting of a group II–VI compound, a Zn compound, a Cd compound, and amorphous silicon.

* * * * *